(12) United States Patent
Okamoto et al.

(10) Patent No.: US 6,645,896 B2
(45) Date of Patent: Nov. 11, 2003

(54) DIELECTRIC CERAMIC COMPOSITION FOR HIGH FREQUENCY AND DIELECTRIC RESONATOR

(75) Inventors: Susumu Okamoto, Kyoto (JP); Yoshitaka Nagamori, Kyoto (JP); Toshiaki Maeoka, Kyoto (JP)

(73) Assignee: Hayashi Chemical Industry Co., Ltd., Kyoto (JP)

( * ) Notice: Subject to any disclaimer, the term of this patent is extended or adjusted under 35 U.S.C. 154(b) by 18 days.

(21) Appl. No.: 09/990,277

(22) Filed: Nov. 23, 2001

(65) Prior Publication Data

US 2002/0115553 A1 Aug. 22, 2002

(30) Foreign Application Priority Data

Dec. 20, 2000 (JP) ........................................ 2000-386407
May 28, 2001 (JP) ........................................ 2001-158909

(51) Int. Cl.⁷ ............................................. C04B 35/465
(52) U.S. Cl. ........................ 501/136; 501/134; 501/135
(58) Field of Search ................................ 501/134, 135, 501/136

(56) References Cited

U.S. PATENT DOCUMENTS 5,356,844 A   10/1994   Hirahara et al.

FOREIGN PATENT DOCUMENTS

JP   7-57537   8/1993
RU   590299    2/1978

*Primary Examiner*—Elizabeth D. Wood
(74) *Attorney, Agent, or Firm*—Kirschstein, et al.

(57) ABSTRACT

A dielectric ceramic composition for high frequency is obtained by using La and/or Nd in the main composition and iron as the additive. The main composition is expressed by the general formula $$x(Ca_y TiO_{2+y}) \cdot (1-x)(Ln_z Al_{2-z} O_3)$$

where Ln is at least one rare earth element containing La and/or Nd, and $0.600 \leq x \leq 0.730$, $0.950 \leq y \leq 1.050$, $0.980 \leq z \leq 1.030$, and 0.01 to 0.5 parts by weight of iron as $Fe_2O_3$ is added to 100 parts by weight of the main composition. NiO may be comprised together with the $Fe_2O_3$.

3 Claims, No Drawings

DIELECTRIC CERAMIC COMPOSITION FOR HIGH FREQUENCY AND DIELECTRIC RESONATOR

BACKGROUND OF THE INVENTION

The present invention relates to a dielectric material for high frequency, and a dielectric resonator, a dielectric filter and a dielectric duplexer obtained with use of it.

Propagation of communications equipments utilizing a high frequency region such as microwave has been very remarkable in recent years. Dielectric ceramics came to be widely used as a materials for dielectric filters and circuit boards of the equipments used in this region.

The dielectric ceramics used here is required to have a high specific dielectric constant $\in r$, a higher-unloaded quality coefficient Q and a lower temperature coefficient of resonance frequency.

Conventionally, many compositions has been known as such dielectric ceramic materials for high frequency. For example, a composition consisting of $Ln_2O_3$—$Al_2O_3$—$CaO$—$TiO_2$ (Ln is a rare earth element) is disclosed as a material which has a specific dielectric constant of not lower than 30, an unloaded quality coefficient Q of not lower than 20000 at 1 GHz and can control the temperature coefficient of resonance frequency $\tau f$ within ±30 ppm (Japanese Patent Publication No. 2625074 and Japanese Laid-Open Patent Publication No. 57537 of 1995).

Also, U.S.S.R Patent No. 590299 discloses that a ceramic composition based on $LaAlO_3$—$CaTiO_3$ comprising La as a rare earth element is useful in thin membrane condensers.

A composition consisting of $LaAlO_3$ and $CaTiO_3$ or a composition consisting of $NdAlO_3$ and $CaTiO_3$ is a material which has a specific dielectric constant $\tau r$ of not lower than 30 and an unloaded quality coefficient Q of not lower than 20000 at 1 GHz and can control the temperature coefficient $\tau f$ of resonance frequency within ±30 ppm. However, it has been difficult to get a material which can produce stably in a large scale a dielectric ceramic element superior in total balance and with a higher characteristic.

An object of the present invention is to provide a dielectric composition for high frequency, which has a specific dielectric constant $\tau r$ of not lower than 40, an unloaded quality coefficient Q of not lower than 40000 at 1 GHz and can control the temperature coefficient $\tau f$ of resonance frequency within ±20 ppm.

SUMMARY OF THE INVENTION

According to the present invention, the above object has been attained by using La and/or Nd as the rare earth element and iron as the additive.

Thus, the dielectric ceramic composition for high frequency according to the present invention comprises a main composition expressed by the general formula $x(Ca_yTiO_{2+y})\cdot(1-x)(Ln_zAl_{2-z}O_3)$ where Ln is at least one rare earth element containing La and/or Nd, and $0.600 \leq x \leq 0.730$, $0.950 \leq y \leq 1.050$, $0.980 \leq z \leq 1.030$, and iron, which is added as $Fe_2O_3$ in an amount of 0.01 to 0.5 parts by weight to 100 parts by weight of the main composition.

DETAILED DESCRIPTION OF THE INVENTION

Ln may consist of La or Nd each alone or may contain them together, or may contain at least one of them and another rare earth element. However, when the value of said x exceeds 0.730, the temperature coefficient $\tau f$ of resonance frequency comes to be higher than 20 ppm and the unloaded quality coefficient Q at 1 GHz comes to be decreased to 30000 level or 20000 level and no desired effect can be obtained.

Reversely, when the value of x comes to be lower than 0.600, the temperature coefficient $\tau f$ of resonance frequency comes to be negatively high and a specific dielectric constant $\in r$ of not lower than 40 cannot be obtained.

When the value of y is lower than 0.950 or exceeds 1.050, the specific dielectric constant $\in r$ comes to be low and a specific dielectric constant $\in r$ of not lower than 40 cannot be obtained and at the same time the fQ value is also lowered and a fQ value of not lower than 40000 cannot be obtained. When the z value is lower than 0.980 or exceeds 1.030, similarly the specific dielectric constant $\in r$ and the fQ value are lowered and no desired effect can be attained.

Furthermore, the present invention is characterized in that iron is added. The added amount may be in a ratio of 0.01 to 0.5 part by weight as $Fe_2O_3$ to 100 parts by weight of the main composition. When the added amount exceeds 0.5 part by weight, the fQ value cannot be increased. When it is lower than 0.01 part by weight, a fQ value not lower than 40000 cannot be obtained.

In the present invention, as far as the object is not impaired, additives such as $SiO_2$, $MnO_2$, $NiO$, $CuO$, $B_2O_3$ and $Li_2CO_3$ may be added.

A dielectric resonator of high performance can be prepared by using such a composition according to the present invention. Said resonator is prepared by firing the ceramic composition as mentioned above.

The content of impurities at the stage before calcination is important. Particularly, it is highly specific that $SO_4$ anion largely affects the deterioration of the dielectric material characteristics and the inhibition of sintering.

Accordingly, it is required to use raw materials of high purity. In the present invention, lanthanum oxide and/or neodymium oxide and calcium carbonate used as the raw materials are dissolved in nitric acid and the nitric acid-insoluble materials contained in the raw materials is filtered off to remove most of $SO_4$ anion so that a product of high performance can be obtained.

Furthermore, uniform mixing of raw materials is desired at the stage before calcination. In the present invention, lanthanum oxide and/or neodymium oxide and calcium carbonate are dissolved in nitric acid, other raw materials (titanium oxide and aluminium oxide) are mixed together and then the mixture is pulverized until an average particle size is not higher than 0.5 $\mu m$, preferably not higher than 0.4 $\mu m$, to enable stable uniform mixing.

Though ferric sulfate (and nickel oxide) may be added from the beginning, it is preferred that it is added after calcinating the main composition, the mixture is pulverized, and the whole is mixed uniformly and then fired. A binder such as polyvinyl alcohol may be used for molding before firing.

PREFERRED EMBODIMENTS OF THE INVENTION

The following examples serve to illustrate the invention in more detail although the invention is not limited to the examples.

EXAMPLES 1 to 17

Comparative Examples 1 to 8

Lanthanum oxide, neodymium oxide, aluminium oxide, calcium oxide and titanium oxide of each high purity were weighed to give compositions shown in Table 1, wet-mixed in a ball mill for 16 hours, pulverized, dried and then calcinated at 1150 to 1300° C. for 8 hours.

After calcinated, it was pulverized in a mill until the average particle size was 0.7 μm or less and ferric oxide and nickel oxide were added to it in the ratios shown in Table 1 and mixed together. Then polyvinyl alcohol was added to the mixture and the resultant material was granulated by spray drying.

The granulated powder was molded to a disc form under a pressure of 1 ton/cm$^2$ and fired in air at 1350 to 1400° C. for 12 hours and the disc surface of the fired product was surface-ground and the ratio of diameter to height was made to be 10/4 and the resonance frequency and tan δ measured by the cavity open type dielectric resonator method. The specific dielectric constant ∈r, the unloaded quality coefficient Q and the temperature coefficient τf of resonance frequency were calculated from them. The results are shown in Table 2

TABLE 1

| | Composition | | | | Added amount of Fe$_2$O$_3$ (wt %) | Added amount of NiO (wt %) |
|---|---|---|---|---|---|---|
| | Rare earth element | x | y | z | | |
| Examples | | | | | | |
| 1 | La | 0.710 | 1.000 | 1.000 | 0.02 | 0 |
| 2 | La | 0.679 | 1.000 | 1.000 | 0.02 | 0 |
| 3 | La | 0.667 | 1.000 | 1.000 | 0.02 | 0 |
| 4 | La | 0.639 | 1.000 | 1.000 | 0.02 | 0 |
| 5 | La | 0.600 | 1.000 | 1.000 | 0.02 | 0 |
| 6 | La | 0.667 | 0.950 | 1.000 | 0.02 | 0 |
| 7 | La | 0.667 | 1.050 | 1.000 | 0.02 | 0 |
| 8 | La | 0.667 | 1.000 | 0.980 | 0.02 | 0 |
| 9 | La | 0.667 | 1.000 | 1.030 | 0.02 | 0 |
| 10 | La | 0.667 | 1.000 | 1.000 | 0.01 | 0 |
| 11 | La | 0.667 | 1.000 | 1.000 | 0.05 | 0 |
| 12 | La | 0.667 | 1.000 | 1.000 | 0.50 | 0 |
| 13 | Nd | 0.730 | 1.000 | 1.000 | 0.02 | 0 |
| 14 | Nd | 0.700 | 1.000 | 1.000 | 0.02 | 0 |
| 15 | Nd | 0.672 | 1.000 | 1.000 | 0.02 | 0 |
| 16 | Nd | 0.645 | 1.000 | 1.000 | 0.02 | 0 |
| 17 | Nd | 0.700 | 1.000 | 1.000 | 0.30 | 0 |
| Comparative Examples | | | | | | |
| 1 | La | 0.734 | 1.000 | 1.000 | 0.02 | 0 |
| 2 | La | 0.575 | 1.000 | 1.000 | 0.02 | 0 |
| 3 | La | 0.667 | 0.900 | 1.000 | 0.02 | 0 |
| 4 | La | 0.667 | 1.100 | 1.000 | 0.02 | 0 |
| 5 | La | 0.667 | 1.000 | 0.950 | 0.02 | 0 |
| 6 | La | 0.667 | 1.000 | 1.050 | 0.02 | 0 |
| 7 | La | 0.667 | 1.000 | 1.000 | 0.00 | 0 |
| 8 | La | 0.667 | 1.000 | 1.000 | 0.80 | 0 |

TABLE 2

| | ∈r | fQ (GHz) | τf (ppm/° C.) |
|---|---|---|---|
| Examples | | | |
| 1 | 46.6 | 41500 | +19.5 |
| 2 | 46.0 | 45500 | +5.50 |
| 3 | 43.9 | 47400 | +0.50 |
| 4 | 42.0 | 48800 | −9.20 |
| 5 | 40.5 | 49200 | −19.0 |
| 6 | 41.6 | 42200 | +1.10 |
| 7 | 40.2 | 41000 | +1.25 |
| 8 | 42.0 | 45000 | +1.50 |
| 9 | 40.9 | 41800 | +0.10 |
| 10 | 44.0 | 44000 | +0.40 |
| 11 | 43.1 | 42000 | +0.90 |
| 12 | 41.8 | 40800 | +0.90 |
| 13 | 45.5 | 48000 | +19.9 |
| 14 | 45.5 | 48300 | +0.4 |
| 15 | 44.4 | 48600 | −12.1 |
| 16 | 43.8 | 48800 | −19.2 |
| 17 | 44.2 | 45200 | +1.0 |
| Comparative Examples | | | |
| 1 | 43.5 | 36100 | +34.5 |
| 2 | 38.9 | 48800 | −26.1 |
| 3 | 37.5 | 33000 | +0.70 |
| 4 | 37.0 | 29000 | −0.20 |
| 5 | 41.2 | 38000 | +1.80 |
| 6 | 42.8 | 28000 | −0.30 |
| 7 | 43.7 | 37300 | +0.40 |
| 8 | 41.9 | 32100 | +1.40 |

EXAMPLES 18 TO 22

Calcium carbonate, titanium oxide, aluminium oxide, neodymium oxide and/or lanthanum oxide were weighed to obtain compositions as shown in Table 3. Calcium carbonate and neodymium oxide and/or lanthanum oxide were dissolved in an equal amount of 2 N nitric acid and the solution was filtered to remove insoluble materials and then mixed with aluminum oxide and titanium oxide.

This mixture was pulverized in a ball mill until the average particle size was not higher than 0.4 μm and then the content was taken out and aqueous ammonia was added to neutralize it to a pH of 8 and it was dried and calcinated at 1200° C. for 2 hours. After calcinated, Fe$_2$O$_3$ and NiO were added in ratios shown in Table 1 and the mixture was pulverized in a mill until the average particle size was not higher than 0.7 μm and polyvinyl alcohol was added and the mixture was granulated by spray drying.

The resultant granulated powder was molded to disc form under a pressure of 1 ton/cm$^2$ and fired in air at 1400° C. for 12 hours. The disc surface of the fired product was surface-ground and the ratio of diameter to height was made to be 10/4 and the resonance frequency and tan δ were measured by the cavity open type dielectric resonator method. The specific dielectric constant ∈r, the unloaded quality coefficient Q and the temperature coefficient τf of resonance frequency were calculated from them. The results are shown in Table 4.

Comparative Examples 9 and 10

The method same as in Examples 18 and 20 was carried out by using compounds of same purities as in Examples 18 and 20 but by not treating calcium carbonate and neodymium oxide with nitric acid.

The results are shown in Table 4,

TABLE 3

| | Composition | | | | Nitric acid treatment | Added amount of Fe$_2$O$_3$ (wt %) | Added amount of NiO (wt %) |
|---|---|---|---|---|---|---|---|
| | Rare earth element | x | y | z | | | |
| Examples | | | | | | | |
| 18 | Nd | 0.730 | 1.000 | 1.000 | Yes | 0.02 | 0.01 |
| 19 | Nd | 0.701 | 1.000 | 1.000 | Yes | 0.30 | 0.01 |
| 20 | Nd | 0.701 | 1.000 | 1.000 | Yes | 0.02 | 0.01 |
| 21 | 0.4La +0.6Nd | 0.695 | 1.000 | 1.000 | Yes | 0.02 | 0.005 |
| 22 | La | 0.639 | 1.000 | 1.000 | Yes | 0.02 | 0.005 |
| Comparative Examples | | | | | | | |
| 9 | Nd | 0.701 | 1.000 | 1.000 | No | 0.02 | 0.01 |
| 10 | Nd | 0.730 | 1.000 | 1.000 | No | 0.02 | 0.01 |

TABLE 4

| | εr | fQ (GHz) | τf (ppm/°C) -30~20° C. | τf (ppm/°C) 20~70° C. |
|---|---|---|---|---|
| Examples | | | | |
| 18 | 45.5 | 48000 | +19.0 | +19.9 |
| 19 | 44.2 | 45200 | −1.7 | −1.1 |
| 20 | 44.9 | 46500 | +0.2 | +0.9 |
| 21 | 43.2 | 45300 | +3.0 | +3.5 |
| 22 | 43.0 | 45500 | −2.5 | −2.0 |
| Comparative Examples | | | | |
| 9 | 45.3 | 27500 | +0.9 | +1.5 |
| 10 | 45.5 | 26200 | +19.5 | +20.5 |

According to the present invention, a dielectric ceramic which has a specific dielectric constant of not lower than 40, an unloaded quality coefficient Q converted to 1 GHz of not lower than 40000 and can control the temperature coefficient τf of resonance frequency within ±20 ppm can be prepared stably and easily.

What is claimed is:

1. A dielectric ceramic composition for high frequency, in which the main composition is expressed by the general formula $$x(Ca_yTiO_{2+y}) \cdot (1-x)(Ln_zAl_{2-z}O_3)$$

where Ln is at least one rare earth element containing La and/or Nd, and $0.600 \leq x \leq 0.730$, $0.950 \leq y \leq 1.050$, $0.980 \leq z \leq 1.030$, and 0.01 to 0.5 parts by weight of iron as Fe$_2$O$_3$ is added to 100 parts by weight of the main composition.

2. A composition according to claim 1, in which 0.005 to 0.15 weight % of NiO is comprised together with said Fe$_2$O$_3$.

3. A dielectric resonator prepared by firing a ceramic composition in which the main composition is expressed by the general formula $$x(Ca_yTiO_{2+y}) \cdot (1-x)(Ln_zAl_{2-z}O_3)$$

where Ln is at least one rare earth element containing La and/or Nd, and $0.600 \leq x \leq 0.730$, $0.950 \leq y \leq 1.050$, $0.980 \leq z \leq 1.030$, and 0.01 to 0.5 parts by weight of iron as Fe$_2$O$_3$ is added to 100 parts by weight of the main composition.

* * * * *